United States Patent
Tonjes et al.

(10) Patent No.: US 6,871,771 B2
(45) Date of Patent: Mar. 29, 2005

(54) AUTOMATED HEADER BRAZING MACHINE

(76) Inventors: Douglas G. Tonjes, 2505 S. Flagler Ave., Flagier Beach, FL (US) 32136; Marc C. Larose, 2685 Concord Rd., Deland, FL (US) 32720; Ken D. Will, 2509 Fairmont Ave., New Smyrna Beach, FL (US) 32168

( * ) Notice: Subject to any disclaimer, the term of this patent is extended or adjusted under 35 U.S.C. 154(b) by 294 days.

(21) Appl. No.: 10/133,837

(22) Filed: Apr. 26, 2002

(65) Prior Publication Data

US 2003/0201302 A1 Oct. 30, 2003

(51) Int. Cl.$^7$ .................... B23K 37/00; B23K 20/08; B23Q 15/00
(52) U.S. Cl. .................. 228/4.1; 228/10; 228/49.1; 228/25
(58) Field of Search ................ 228/4.1, 8–12, 228/25–33, 44.3, 44.5, 45, 47.1–49.3, 51, 102, 118

(56) References Cited

U.S. PATENT DOCUMENTS

| | | | |
|---|---|---|---|
| 3,792,882 A | * | 2/1974 | Varichon .................... 403/171 |
| 3,830,420 A | * | 8/1974 | Milana et al. ................. 228/9 |
| 3,991,927 A | | 11/1976 | Napor et al. |
| 4,071,181 A | * | 1/1978 | Plegat ......................... 228/43 |
| 4,158,161 A | * | 6/1979 | Suzuki ......................... 318/578 |
| 4,192,986 A | * | 3/1980 | Udagawa et al. ........ 219/137 R |
| 4,338,712 A | | 7/1982 | Dearman |
| 4,404,455 A | * | 9/1983 | Gotoh .................... 219/124.34 |
| 4,471,202 A | * | 9/1984 | Riordan et al. .......... 219/85.19 |
| 4,637,133 A | | 1/1987 | Freeman |
| 4,742,950 A | * | 5/1988 | Neitz ...................... 228/234.1 |
| 4,824,007 A | * | 4/1989 | Depaoli et al. ............. 228/102 |
| 4,860,938 A | * | 8/1989 | Clark ......................... 228/102 |
| 5,031,819 A | | 7/1991 | Weon et al. |
| 5,098,006 A | | 3/1992 | McManus |
| 5,107,937 A | * | 4/1992 | Yeargin et al. ............... 175/27 |
| 5,125,555 A | | 6/1992 | Grisoni et al. |
| 5,161,289 A | | 11/1992 | Adams et al. |
| 5,226,234 A | * | 7/1993 | Beddome et al. ....... 29/890.039 |
| 5,343,620 A | | 9/1994 | Velluet |
| 5,462,216 A | | 10/1995 | Nishimura |
| 5,549,238 A | * | 8/1996 | Hindle ....................... 228/183 |
| 5,768,137 A | * | 6/1998 | Polidoro et al. ............ 700/186 |
| 5,901,897 A | * | 5/1999 | Takahashi et al. ............. 228/8 |
| 5,902,498 A | | 5/1999 | Mistry et al. |
| 6,027,007 A | * | 2/2000 | Bosio ........................ 228/102 |
| 6,209,774 B1 | | 4/2001 | LeBlanc et al. |

* cited by examiner

*Primary Examiner*—Stanley S. Silverman
*Assistant Examiner*—Colleen P Cooke
(74) *Attorney, Agent, or Firm*—John Wiley Horton (57) ABSTRACT

A machine for determining the location of junction tubes along a header and automatically brazing them to the header. A chassis is employed to hold the junction tubes and header in the proper orientation. A carriage then travels along a line which is parallel to the central axis of the header. The carriage includes a sensor which is able to determine the exact position of the junction tubes. This positional information is stored in a controller. The carriage also includes a reciprocating pair of burners for heating the joint to be brazed. A pair of brazing wire feeders are included for feeding the brazing alloy alloy to the joint. A pyrometer is also included for measuring the temperature of the joint during the brazing process. In operation, the carriage slides along with the sensor measuring the position of each joint to be brazed. The burners and brazing alloy feeders are located in such a position on the carriage that the sensor precedes them in coming to each joint location. Thus, the joint location is determined, then the carriage is moved to bring the burners in contact with the joint. Once in position, the burners are moved through a reciprocating motion to evenly heat the joint. A pyrometer is used to monitor the joint temperature (through the operation of the controller). When the appropriate temperature is reached, the controller causes the brazing wire feeders to feed the appropriate amount of brazing alloy to the joint—thereby brazing the joint. The carriage then moves on to the next joint position. The process is repeated until every joint on the header has been brazed.

6 Claims, 13 Drawing Sheets

(PRIOR ART)

AUTOMATED HEADER BRAZING MACHINE

This invention relates to the field of brazed metal assemblies. More specifically, the invention comprises a machine for automatically brazing a series of junction tubes to a header, in order to make a header assembly commonly used in air conditioner products and other similar products.

DESCRIPTION OF THE RELATED ART

Figure 1:
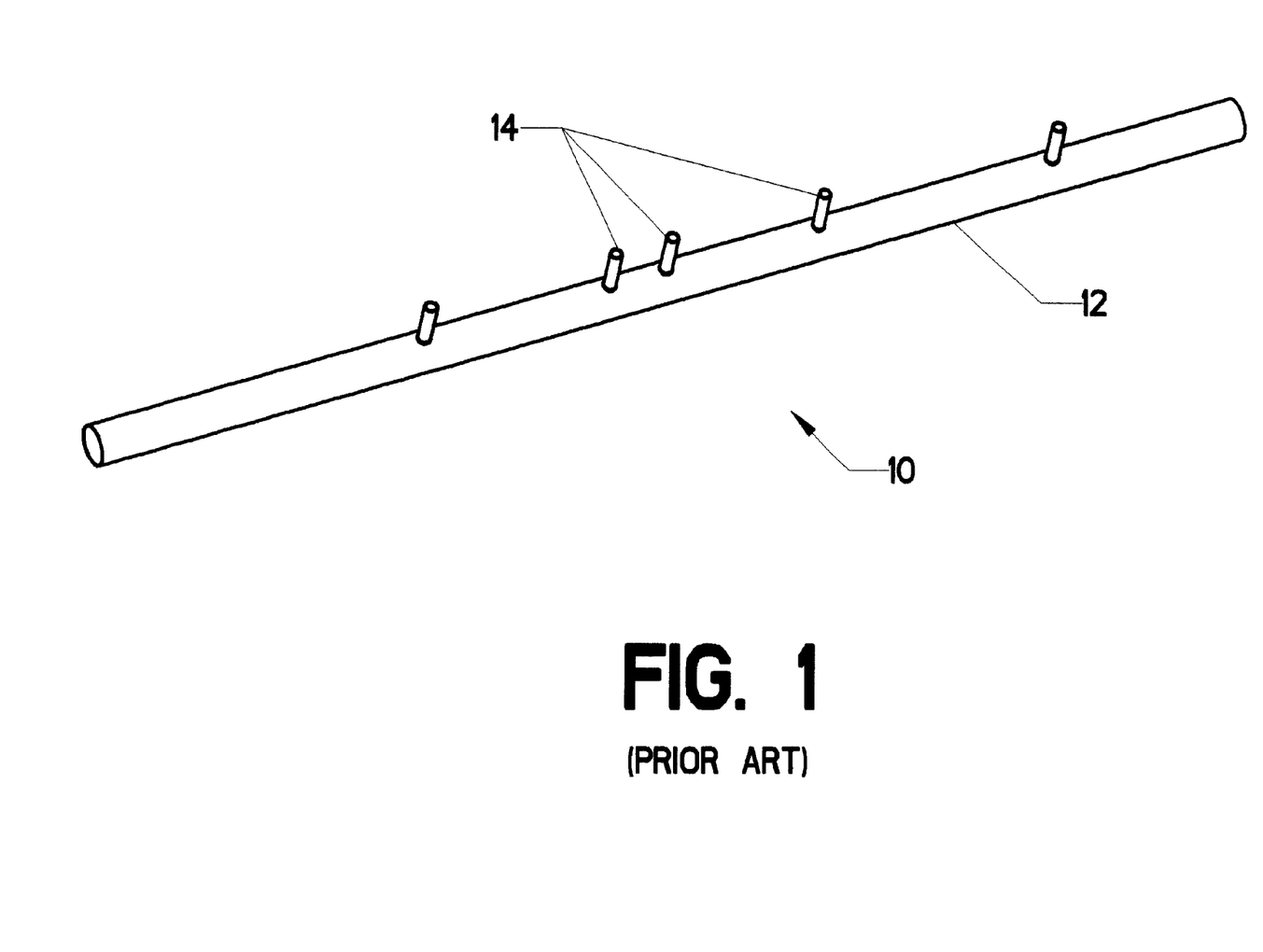
FIG. 1 is an isometric view, showing a prior art header assembly.

"Brazing" is essentially defined as the joining together of two pieces of material by the use of a different material. One specific application for brazing is found in the manufacturing of "headers" for air conditioning systems and similar applications. A header is simply a large tube, to which is joined a smaller tube or tubes. FIG. 1 shows header assembly 10, which is comprised of header 12 and a number of junction tubes 14.

Figure 2:
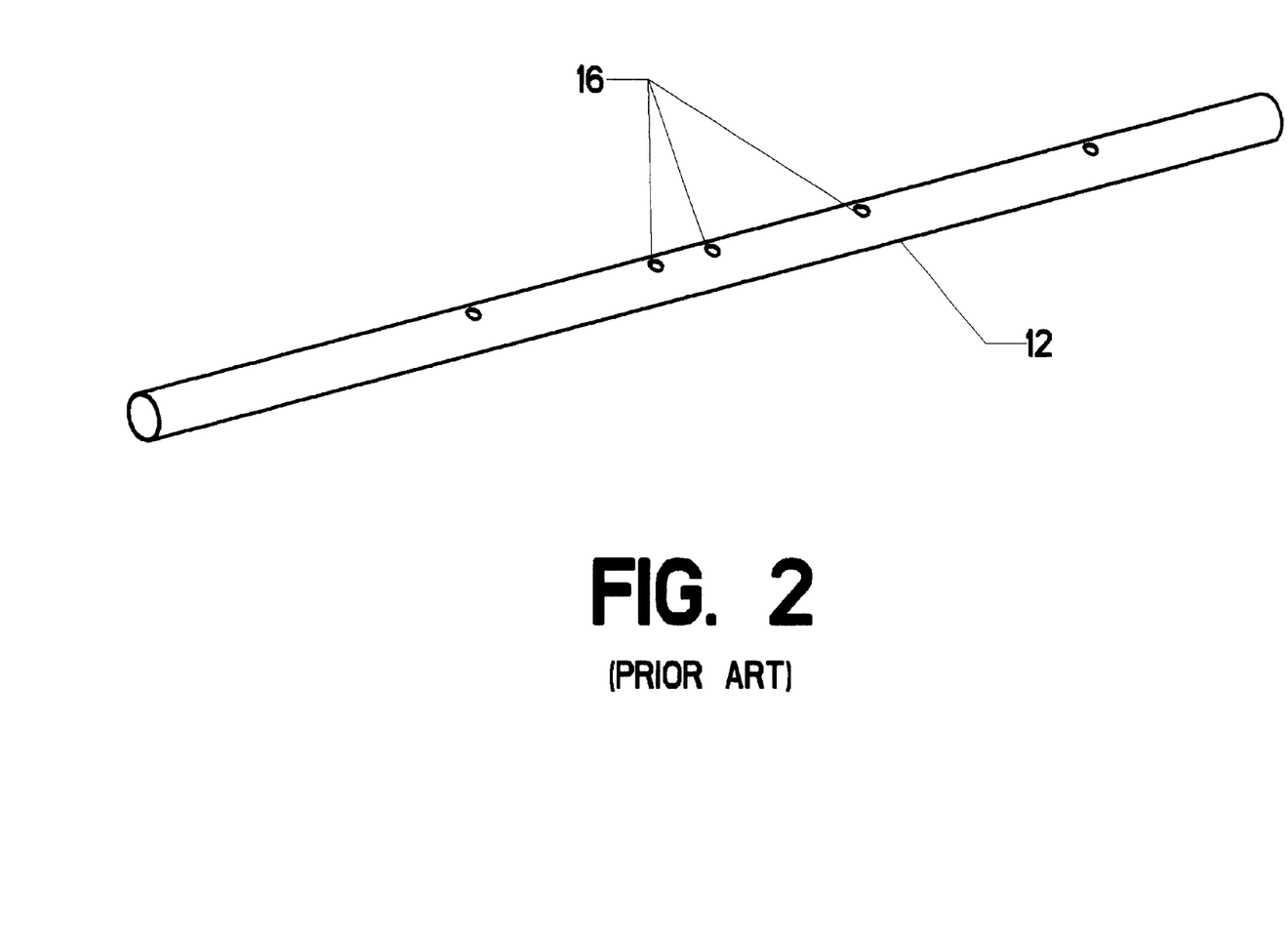
FIG. 2 is an isometric view, showing a prior art header.
Figure 3:
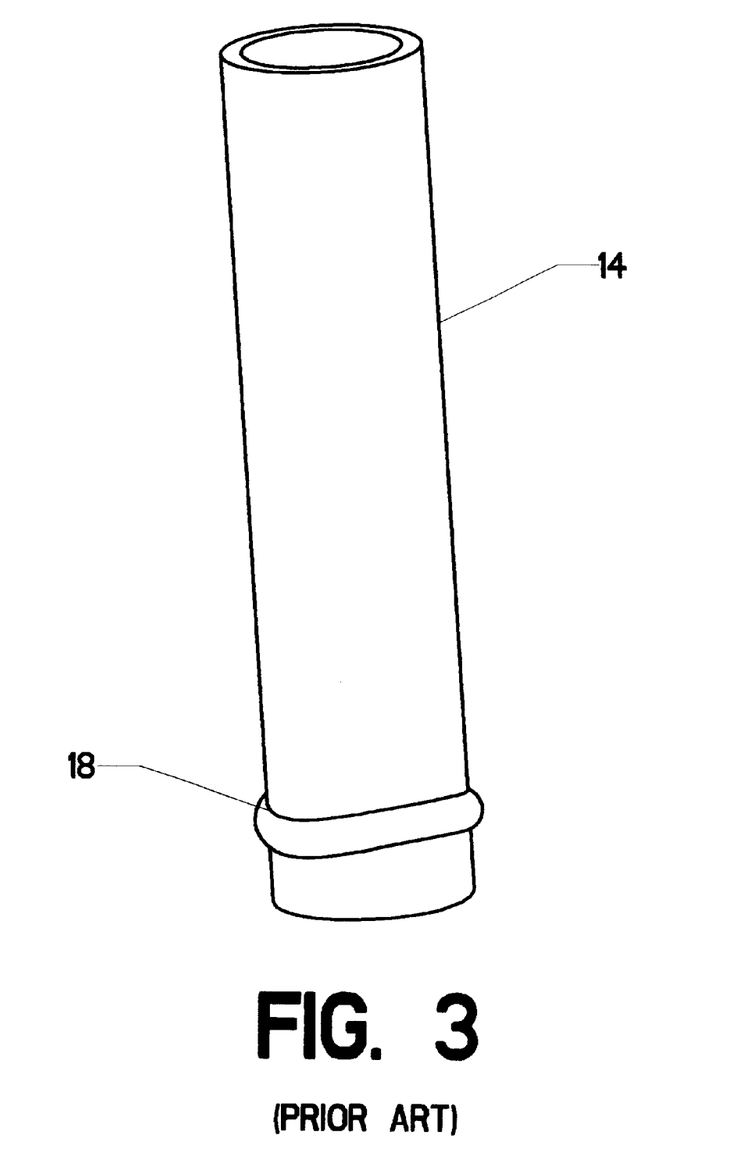
FIG. 3 is an isometric view, showing a prior art junction tube.
Figure 4:
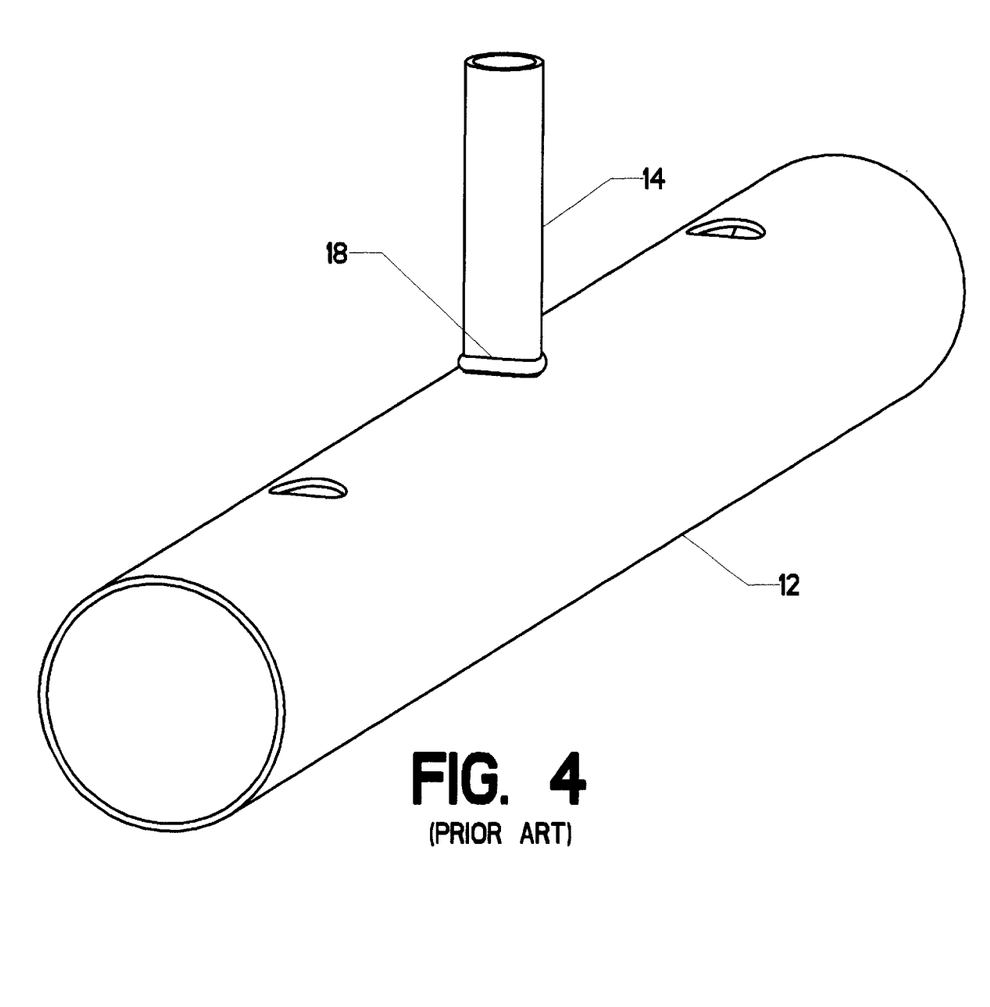
FIG. 4 is an isometric view, showing details of a prior art header joint.

FIG. 2 shows header 12 alone. The reader will observe that it is pierced by numerous holes 16, each of which is intended to become a joint for a junction tube 14. FIG. 3 shows a more detailed view of junction tube 14. Saddle collar 18 is formed near the lower extremity of junction tube 14. It has a "saddle" shape, which allows it to follow the complex intersection created by joining junction tube 14 with header 12 (caused by the intersection of two cylindrical surfaces). Those skilled in the art will know that when junction tube 14 is placed in hole 16, saddle collar 18 will prevent tube 14 from dropping into header 12 (see FIG. 4). The joining of junction tube 14 to header 12 is then typically carried out by a prior art manual brazing process.

Manual brazing processes require considerable skill and judgement—first in the judicious application of heat and second in the manual skill required to apply the brazing filler metal at the correct point. Numerous prior art devices have sought to aid the brazing process. As an example, U.S. Pat. No. 5,098,006 to McManus (1992) discloses a jig designed to hold the parts in a proper orientation for brazing. Such jigs are well known in older prior art. McManus adds a gas purge manifold, which may assist in purging solder flux gases in certain circumstances. Although it does assist in the process, the McManus device still relies on manual brazing.

Automated brazing machines are known in the prior art, however. U.S. Pat. No. 5,031,819 to Weon et. al. (1991) discloses one such machine. The '819 device incorporates an indexed rotary table. It includes multiple burners capable of heating a large assembly, such as an automotive radiator. A flux supply is also included. The device is incapable of accommodating header assemblies such as shown in the present FIG. 1.

Another automated brazing machine is disclosed in U.S. Pat. No. 5,125,555 to Grisoni et. al. (1992). It discloses a gantry-type robot which carries a burner, a weld alloy supply mechanism, and a sensor. The sensor is a mechanical "feeler" type, which surveys and records the geometry of the joint to be brazed (see Column 5 and FIGS. 1 through 6 of the '555 disclosure). A computer controller then moves the torch to heat the joint in a prescribed manner. The initial location of the object to be brazed relative to the sensor must be known with significant accuracy, as the "feeler" type sensor only operates in a relatively small volume. Also, the plane in which the brazed joint lies must generally be known (See Column 5, Lines 24–28). Those skilled in the art will also know that the use of a tactile sensor is typically a very slow process.

The known devices are therefore limited in that they:
1. Require the location of the brazed joints to be known in advance;
2. Are incapable of rapid operation; and
3. Are not well adapted to the manufacturing of tubular header assemblies.

BRIEF SUMMARY OF THE INVENTION

The present invention comprises an apparatus for determining the location of junction tubes and automatically brazing them to a header. A chassis is employed to hold the junction tubes and header in the proper orientation. A carriage then travels along in a direction parallel to the central axis of the header. The carriage includes a sensor which is able to determine the exact position of the junction tubes along the header. This positional information is stored in a controller. The carriage also includes a reciprocating pair of burners for heating the joint to be brazed. A pair of brazing wire feeders are included for feeding the brazing alloy to the joint. A pyrometer is also included for measuring the temperature of the joint during the brazing process.

In operation, the carriage slides along the header, with the sensor measuring the position of each joint to be brazed. The burners and brazing wire feeders are located in such a position on the carriage that the sensor precedes them in coming to each joint location. Thus, the joint location is determined, then the carriage is moved to bring the burners in contact with the joint.

The burners are moved through a reciprocating motion to evenly heat the joint. The pyrometer is used to monitor the joint temperature (through the operation of the controller). When the appropriate temperature is reached, the controller causes the brazing wire feeders to feed the appropriate amount of brazing alloy to the joint—thereby brazing the joint. The carriage them moves on to the next joint position. The process is repeated until every joint on the header has been brazed.

Accordingly, several objects and advantages of the present invention are:
1. To automate the production of header assemblies;
2. To provide the ability to braze a header assembly without first knowing the number of junction tubes or the position of such junction tubes; and
3. To provide a high degree of repeatability in the brazed joints through the use of computer control and automation.

These objects and advantages will be fully explained in the details hereafter described, explained, and claimed, with reference being made to the accompanying drawings.

REFERENCE NUMERALS IN THE DRAWINGS

| | |
|---|---|
| 10 | header assembly |
| 12 | header |
| 14 | junction tube |
| 16 | hole |
| 18 | saddle collar |
| 20 | main bracket |
| 22 | header bracket |
| 24 | header support |
| 26 | tube bracket |
| 28 | tube holder |
| 30 | tube nut |
| 32 | open position |
| 34 | brazing wire |
| 36 | brazing wire feeder |
| 38 | feed tube |
| 40 | chassis |
| 42 | carriage way |
| 44 | carriage |
| 46 | roller |
| 48 | platform |
| 50 | burner motor |
| 52 | burner |
| 54 | reciprocating head |
| 56 | pyrometer |
| 58 | pyrometer bracket |
| 60 | sensor |
| 62 | saddle form joint |
| 64 | crest |
| 66 | trough |
| 68 | feeder bracket |
| 70 | controller |
| 72 | reflector |
| 74 | sensing position |
| 76 | brazing position |

DETAILED DESCRIPTION OF THE INVENTION

Figure 5:
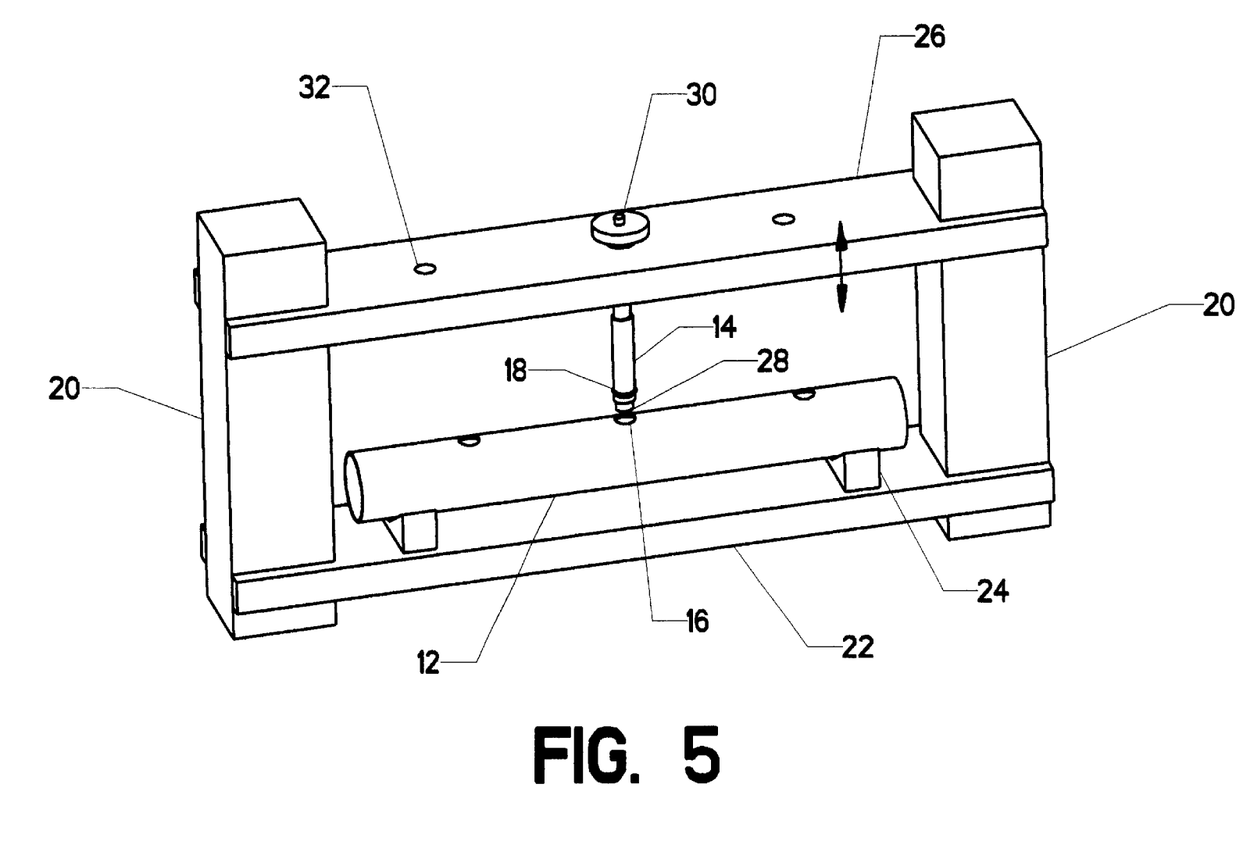
FIG. 5 is an isometric view, showing a simplified version of the jig used in the present invention.

Prior to the commencement of the brazing process, it is important to hold the junction tubes in the correct position relative to the header. FIG. 5 shows a simple version of an appropriate fixture. A very simple header 12 is shown. Two main brackets 20 support the fixtures. A header bracket 22, with at lease two header supports 24, holds header 12 in place. Tube bracket 26 is vertically adjustable relative to the two main brackets 20. In the view as shown, a single tube holder 28 has been attached to tube bracket 26 by tube nut 30. Open positions 32 are available for the addition of more tube holders 28 but, in this simple version, only one is needed.

Those skilled in the art will know that header assemblies are manufactured with junction tubes in many different locations. Thus, a variety of different tube brackets 26 will often be used, with each one corresponding to a particular type of header (or possibly having adjustments to accommodate several different types).

Figure 6:
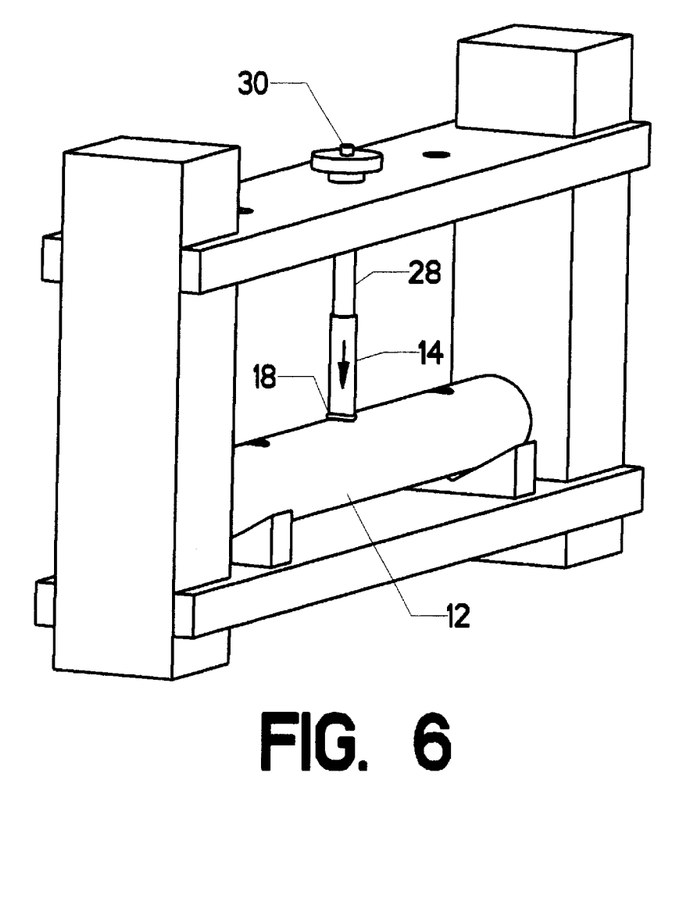
FIG. 6 is an isometric view, showing a simplified version of the jig used in the present invention.

In application, the user selects the right tube bracket 26 and then places a junction tube 14 on each of the tube holders 28. Tube bracket 26 is then lowered into position, so that junction tube 14 mates with hole 16. FIG. 6 shows this position, with junction tube 14 sliding down tube holder 28 and into place on header 12. Tube holder 28 will preferably remain above the position of the joint, so as to remain clear of the brazing operation.

Figure 7:
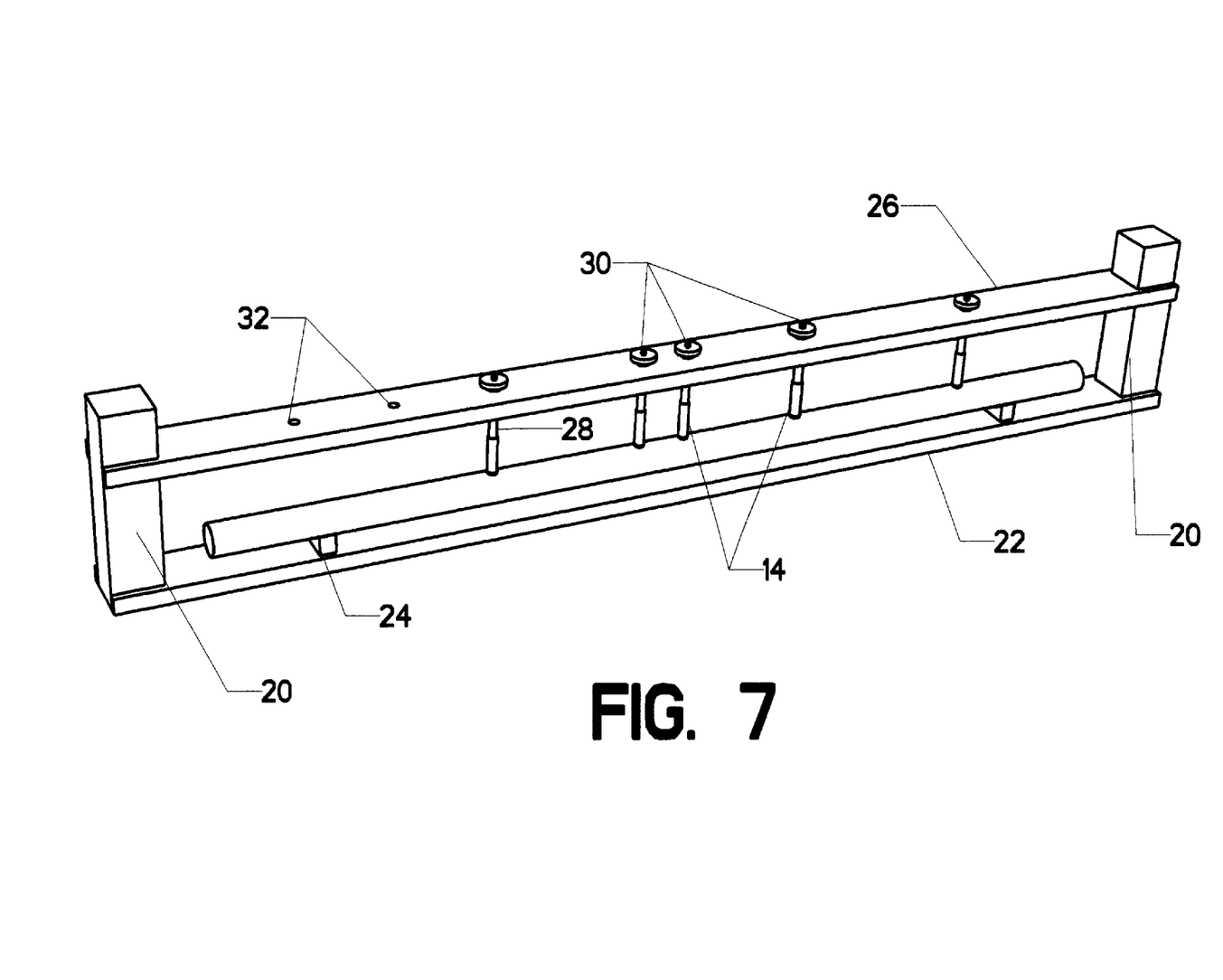
FIG. 7 is a perspective view, showing a more typical version of the jig.

FIG. 7 shows a header 12 of a more typical length. Main brackets 20 must be spaced further apart to accommodate the longer header bracket 22 and tube bracket 26. This particular tube bracket 26 has additional open positions 32 to accommodate various types of headers 12. In the particular version shown, five tube holders 28 are joined using five tube nuts 30. Five junction tubes 14 are thereby held in a vertical orientation over header 12.

Figure 8:
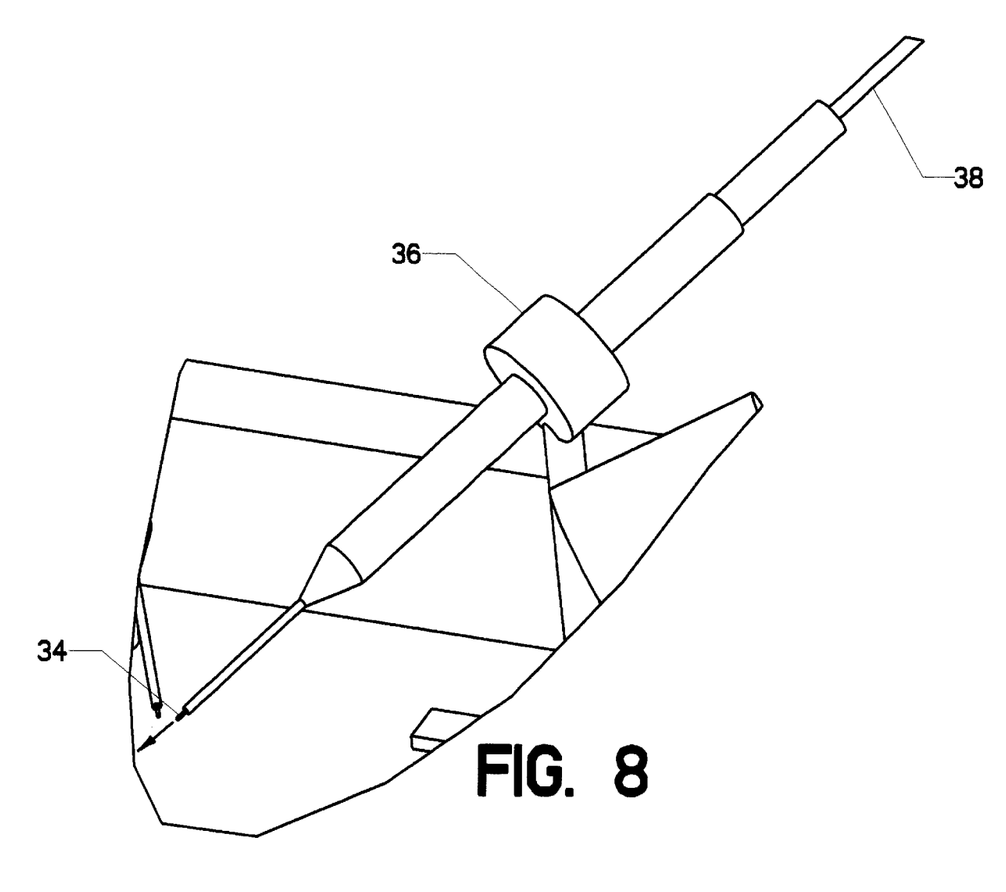
FIG. 8 is an isometric view, showing a brazing wire feeder.

FIG. 8 shows a brazing wire feeder 36. This is a device capable of feeding brazing wire 34 out its end in a controlled fashion. The brazing wire 34 is supplied to brazing wire feeder 36 through feed tube 38. Feed tube 38 is connected to a large spool of brazing wire—typically located a short distance away. Feed tube 38 is flexible in order to accommodate motion between brazing wire feeder 36 and the spool.

Figure 9:
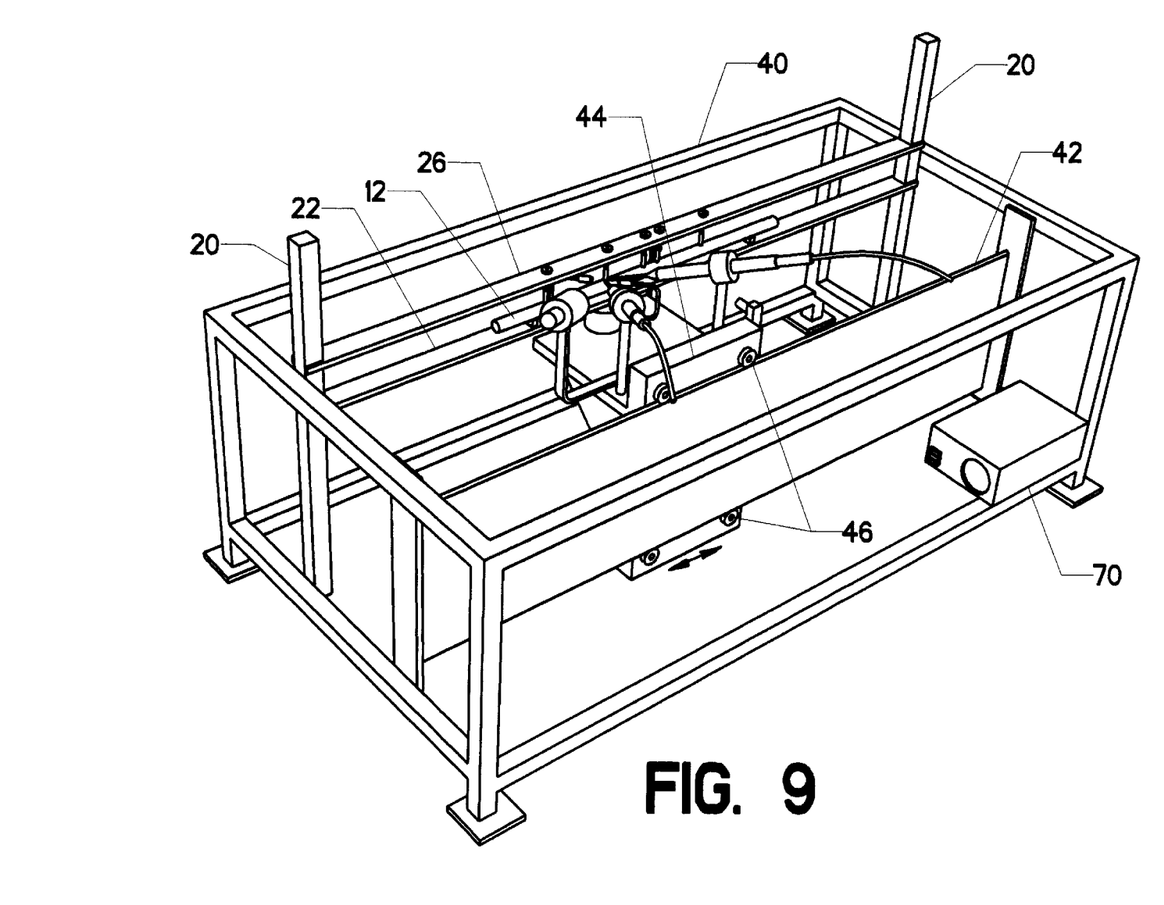
FIG. 9 is a perspective view, showing the major components of the present invention.

FIG. 9 shows the major elements of the automatic brazing machine. Chassis 40 mounts the two end brackets 20, along with the associated hardware for mounting header 12 and junction tubes 14. Carriage way 42 is oriented along an axis which is parallel to the central axis of header 12. Carriage 44 moves along carriage way 42, with its motion being controlled by controller 70. Rollers 46 are provided to minimize friction. Carriage 44 carries numerous devices for performing the brazing operations which ultimately join the junction tubes 14 to header 12.

Figure 10:
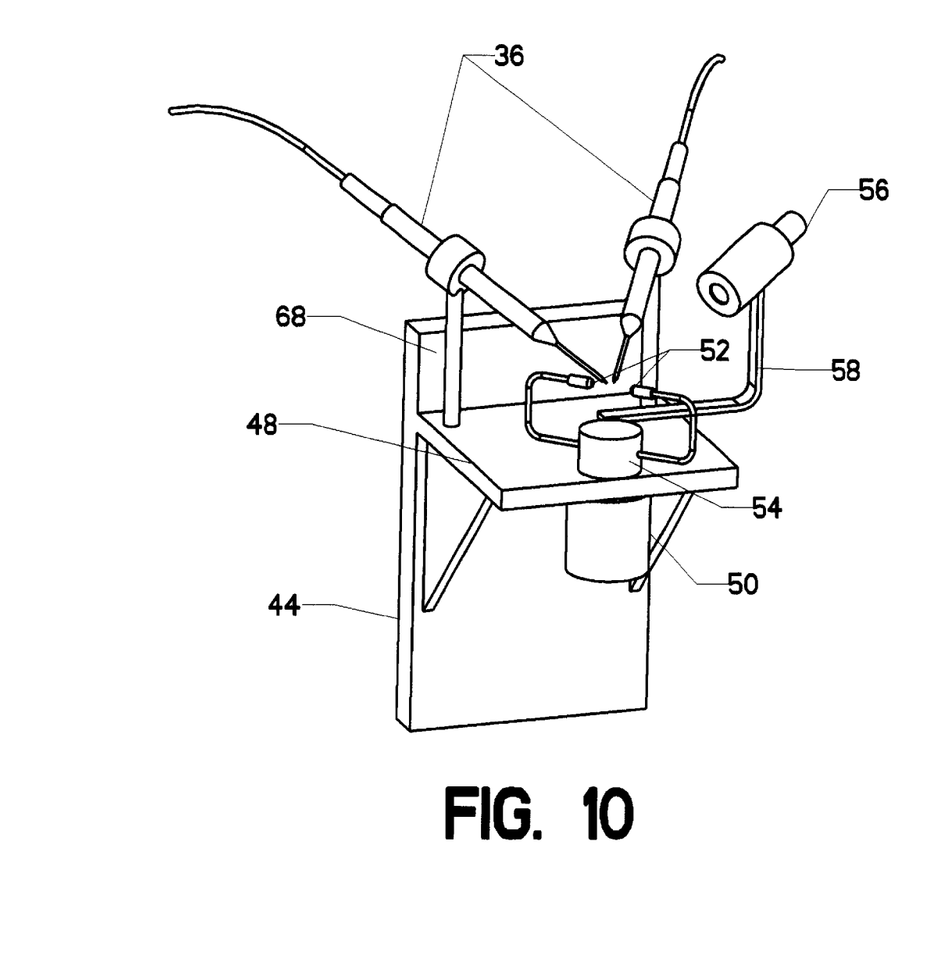
FIG. 10 is an isometric view, showing the details of the carriage.

Chassis 40 also mounts many additional conventional elements—such as the brazing alloy spools, gas supply controls, electrical power supplies, safety equipment, etc. As these elements are well known—and as they form no significant part of the present invention—they have not been illustrated. FIG. 10 shows carriage 44, viewed from the opposite direction as that shown in FIG. 9. The motion of carriage 44 relative to carriage way 42 is provided by a toothed belt drive, a screw thread drive, or similar arrangement. The actual method of drive is unimportant, so long as it furnishes reasonable accuracy in position. As such technology is well known in the prior art, it has not been illustrated.

Platform 48 extends out from carriage 44, in a position so that it lies beneath header 12 during the operation of the machine. Platform 48 mounts reciprocating head 54. A pair of burners 52 are mounted to reciprocating head 54, with appropriate gas feed lines. Burner motor 50 drives reciprocating head 54 in an oscillating motion—as will be described subsequently.

Platform 48 also mounts two brazing wire feeders 36, with each having a feeder bracket 68. These are preferably adjustable so that the point of contact for the wire fed from these devices can be altered. Platform 48 also mounts pyrometer 56, via pyrometer bracket 58. Pyrometer 56 is a conventional prior art device which is capable of accurately measuring the temperature of a joint to be brazed without actually touching it. The joint to be brazed will be located between the two burners 52. Thus, the reader will observe, all the elements shown focus on this area. The two burners 52 converge on it, as do the two brazing wire feeders 36 and the pyrometer 56.

Figure 11:
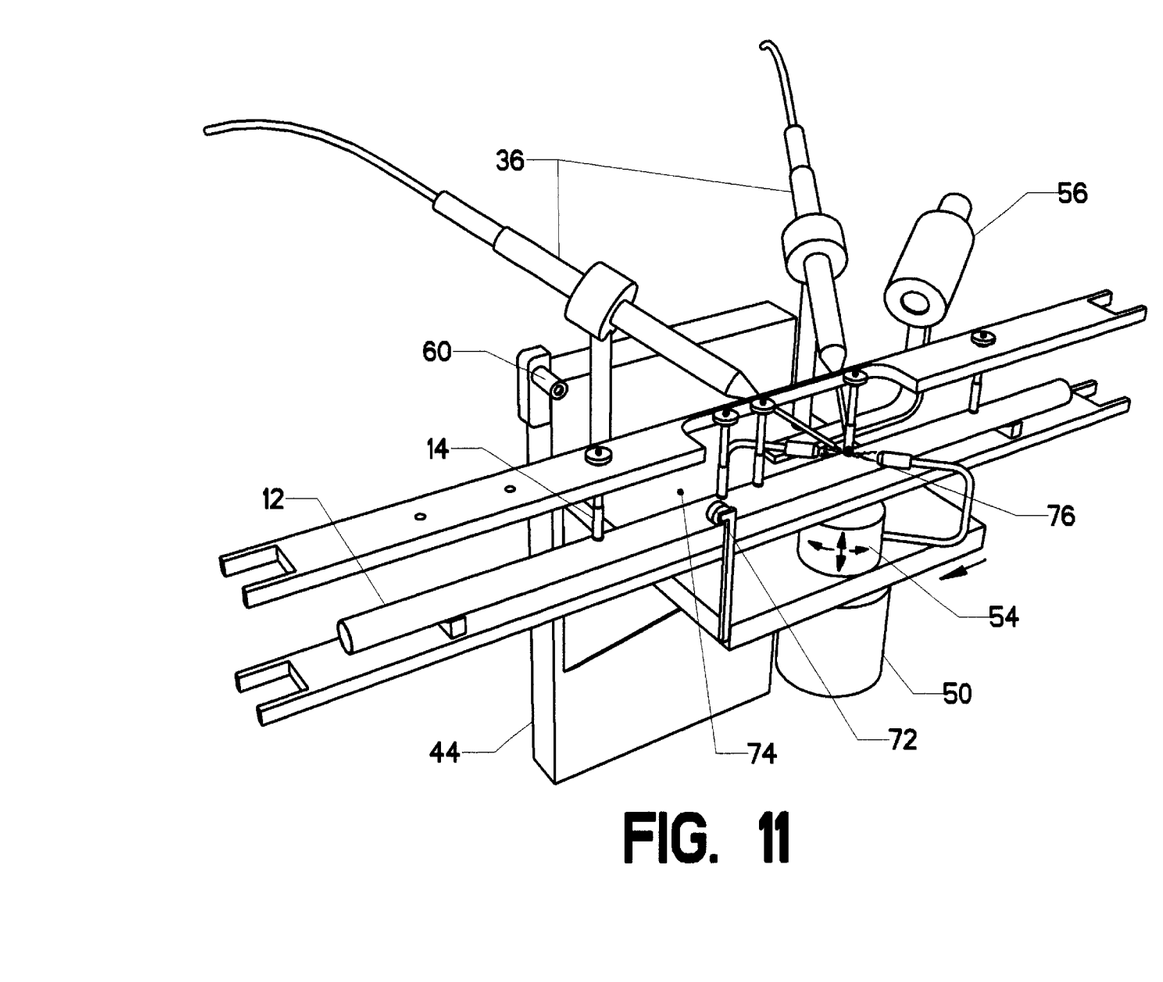
FIG. 11 is a perspective view, describing the operation of the carriage.

FIG. 11 shows carriage 44 actually in position relative to header 12. Carriage 44 will customarily travel along header 12 in the direction shown by the arrow. As discussed previously, it is important for the device to be able to sense a joint location which needs to be brazed, and then be able to bring the appropriate brazing elements to that location. Sensor 60 is added to the leading portion of carriage 44 ("leading" in terms of its direction of travel). In the embodiment shown, sensor 60 transmits a beam of light which is reflected back by reflector 72. The light beam will be interrupted when carriage 44 advances to a joint tube 14. This will occur at the position denoted as sensing position 74.

Sensor 60 can utilize many prior art technologies. However, it is important to note that whichever technology is selected, it must be capable of determining the position of joint tube 14 with reasonable accuracy. As carriage 44 advances, sensor 60 feeds data on the location of joint tube(s) 14 to controller 70. Controller 70 then controls the motion of carriage 44 so as to bring each joint to be brazed to brazing position 76. In the embodiment shown, sensing position 74 and brazing position 76 are separated from each other. This separation allows the device to carry out sensing and brazing operations simultaneously. It also removes sensor 60 from the radiant heat in the area of burners 52. However, those skilled in the art will know that this separation is simply one of design expedience.

Once controller 70 has moved carriage 44 to a position where a joint tube lies at brazing position 76 (as shown), several operations commence. Burner motor 50 causes reciprocating head 54 to rotate back and forth as shown, in order to evenly heat the joint (if not already lit, then burners 52 must be started at this point). Burner motor 50 can also cause reciprocating head 54 to move up and down as shown. The rotary and linear motion can be combined, as will be explained shortly.

As the joint is being heated, pyrometer 56 monitors its temperature. This information is fed to controller 70. When an appropriate temperature is reached, controller 70 fires both brazing wire feeders 36, which advance brazing wire into the joint. The brazing wire melts on contact with the hot metal surfaces and flows around the joint, producing a completely sealed joint.

Once these steps are completed, controller 70 causes carriage 44 to advance down header 12 until the next joint tube 14 is in the proper position. The process is then repeated until all joint tubes 14 have been brazed to header 12. The reader should note that the direction of travel illustrated is wholly arbitrary. The machine can be configured to start at either end, or at some intermediate point.

Figure 11B:
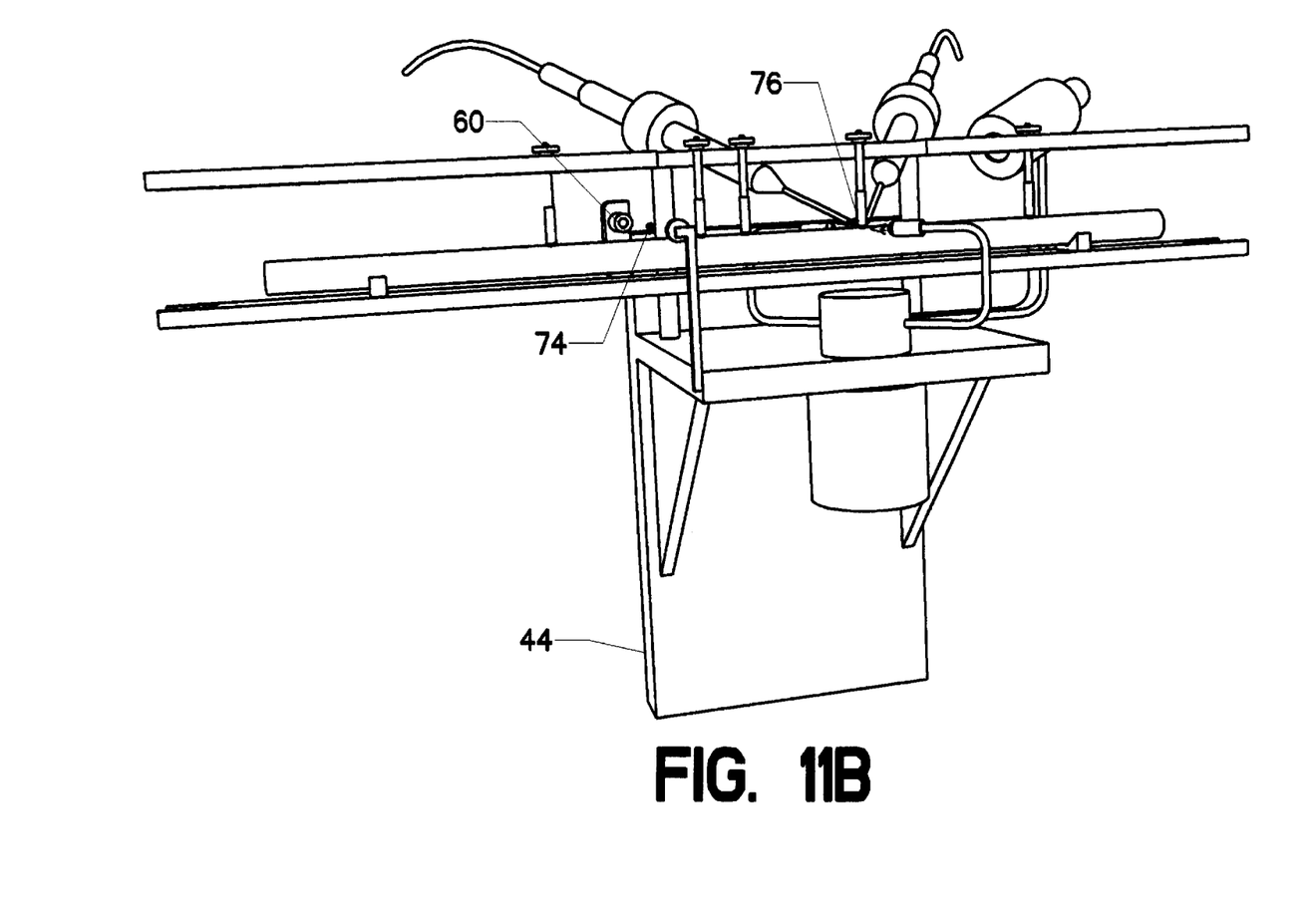
FIG. 11B is a perspective view, showing the operation of the carriage.

FIG. 11B provides a better view of sensing position 74. The reader will observe how sensor 60 is positioned to scan the area just over the top of the header.

Figure 12:
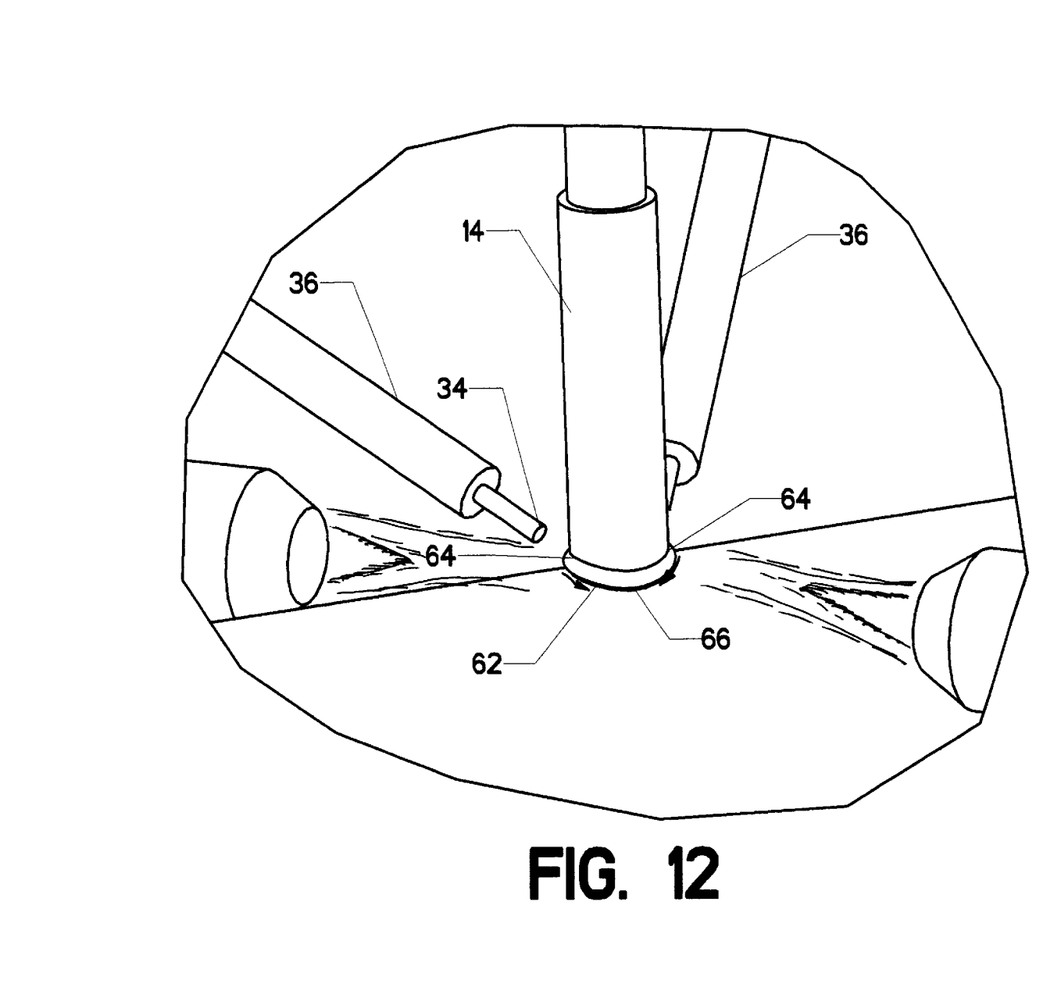
FIG. 12 is an isometric detail view, showing the nature of the brazed joint.

FIG. 12 shows a detailed view of the joint between junction tube 14 and header 12. Because this joint takes the form of two intersecting cylinders, it assumes a saddle shape (denoted as saddle form joint 62). Saddle form joint 62 has two crests 64 and two troughs 66 (one trough is hidden in the view). Each brazing wire feeder 36 is preferably positioned to feed its brazing wire 34 into a crest 64 of saddle form joint 62. The brazing alloy melts at these points. Capillary action (often aided by a flux coating) then causes the molten brazing alloy to flow down toward the two troughs 66, thereby forming a complete seal between junction tube 14 and header 12.

For smaller header assemblies, burners 52 can provide uniform heating by moving only through a reciprocating rotary motion. However, in order to promote uniform heating of larger saddle form joints 62, it is preferable to have burners 52 move along the profile of saddle form joint 62 (tracing the hottest portions of their flame cones along the joint). Returning to FIG. 11, the reader will recall that oscillating head 54 is capable of oscillating motion in both the rotary and vertical degrees of freedom. Those skilled in the art will know that the combination of these types of motion will be required to have burners 52 trace the profile of saddle form joint 62. This combined motion can be accomplished through known prior art mechanisms or the use of digital motor controls. As the combined motion produces more uniform heating, it constitutes the preferred embodiment.

Controller 70 preferably takes the form of a digital computer, such as a programmable logic controller. Through the use of such technology, many features can be incorporated by simply changing lines of software.

Accordingly, the reader will appreciate that the proposed invention can proceed along a header automatically determining the position of joints to be brazed and carrying out the brazing operation. The invention has additional advantages in that it:

1. Does not require the location of the brazed joints to be known in advance;
2. Is capable of rapid operation; and
3. Is capable of performing the brazing, operating with a high degree of repeatability, thereby enhancing quality control.

Although the preceding descriptions convey significant detail about the invention, they should not be construed as limiting the scope of the invention, but rather as providing illustrations of the preferred embodiment. As an example—many different temperature sensing means could be substituted for the use of a pyrometer. It is even possible to simply time the heating operation, rather than actually measuring the temperature of the joint. Accordingly, the scope of the invention should be fixed by the following claims, rather than by the examples given.

Having described our invention, we claim:

1. An automatic brazing machine for joining a plurality of junction tubes to a header, wherein said header is a cylindrical tube having a central axis and said junction tubes lie in an orientation which is approximately perpendicular to said central axis and intersect said header at a series of joints, comprising:
   a. fixturing means for holding said plurality of junction tubes in a fixed position relative to said header;
   b. a carriage;
   c. translation means for creating relative motion between said carriage and said header along an axis lying parallel to said central axis of said header;
   d. wherein said carriage comprises:
      i. sensing means, capable of detecting the presence of each of said joints and determining the position of each of said joints as said carriage moves relative to said header along said central axis;
      ii. heating means; and
      iii. brazing material supply means; and
   e. control means, capable of:
      i. controlling said relative motion between said carriage and said fixturing means so as to bring said heating means in close proximity to each of said joints;
      ii. controlling said heating means so as to heat each of said joints to an appropriate temperature for brazing; and iii. controlling said brazing material supply means so as to feed brazing material to each of said joints once said appropriate brazing temperature has been achieved.

2. An automatic brazing machine as recited in claim 1, wherein said control means is a computer.

3. An automatic brazing machine as recited in claim 1, wherein each of said joints between each of said junction tubes and said header takes a saddle form having two crests and two troughs, wherein:
   a. said fixturing means holds said junction tubes in vertical orientation above said header; and
   b. said heating means comprises:
      i. a first burner, capable of being positioned proximate said first trough of said saddle form; and
      ii. a second burner, capable of being positioned proximate said second trough of said saddle form.

4. An automatic brazing machine as recited in claim 3, wherein:
   a. said first burner and said second burner are attached to a reciprocating head;
   b. motion means for moving said reciprocating head in an oscillating rotary motion; and
   c. motion means for moving said reciprocating head in an oscillating vertical motion, so that said rotary motion and said vertical motion combine to cause said first and second burners to move along opposite sides of said saddle form joint, thereby evenly heating said saddle form joint.

5. An automatic brazing machine as recited in claim 3, wherein said brazing material supply means comprises:
   a. a first brazing material feeder, capable of feeding brazing material into said first crest of said saddle form; and
   b. a second brazing material feeder, capable of feeding brazing material into said second crest of said saddle form, whereby said brazing material will flow from the two said crests toward the two said troughs, thereby completely filling said saddle form joint.

6. An automatic brazing machine as recited in claim 1, wherein said carriage further comprises temperature sensing means capable of sensing the temperature of each joint when said heating means is applied thereto, thereby enabling said controller to determine when said brazing material should be applied to said joint.

* * * * *